May 4, 1965  L. A. SAWYER ETAL  3,181,267
LIVE BAIT CAGE
Filed Feb. 8, 1962

INVENTORS.
LOREN A. SAWYER.
WALTER E. WOOD.
BY
ATTORNEY.

United States Patent Office 3,181,267
Patented May 4, 1965

3,181,267
LIVE BAIT CAGE
Loren A. Sawyer, 628 N. 4th St., and Walter E. Wood,
128 Platte St., both of Sterling, Colo.
Filed Feb. 8, 1962, Ser. No. 171,858
1 Claim. (Cl. 43—55)

This invention relates to equipment primarily useful to anglers, and more particularly to means for maintaining a supply of live baits in unimpaired condition of use and expedient availability, and has as an object to provide a novel and improved live bait cage of enhanced utility, convenience, and practicality.

A further object of the invention is to provide a novel and improved live bait cage that is applicable at option to house terrestrial, amphibious, or aquatic specimens in an appropriate environment and expedient individual availability.

A further object of the invention is to provide a novel and improved live bait cage that is readily manipulable for convenient input of charge and thereafter interiorly accessible for selection and extraction of an individual specimen of its charge with maintained security of charge retention.

A further object of the invention is to provide a novel and improved live bait cage that is compact in a durable construction suited to long endure under onerous conditions of intended use.

A further object of the invention is to provide a novel and improved live bait cage that is simple and economical of production in a wide range of preferred sizes from commonly-available materials; that is susceptible of structural variations and modifications within an extensive area of functional equivalence; and that is positive, efficient, and advantageous in attainment of the ends for which designed.

With the foregoing and other objects in view, our invention consists in the construction, arrangement, and operative combination of elements as hereinafter set forth, pointed out in the appended claim, and illustrated by the accompanying drawing, in which—

Figure 1:
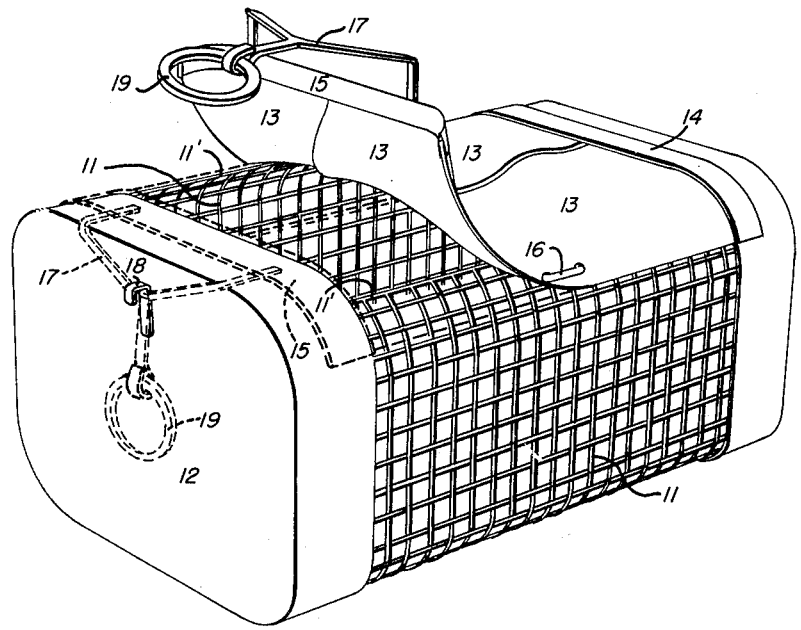
FIGURE 1 is a perspective view of a typical embodiment of the invention as conditioned to receive a live bait charge, an alternative, cage-closing correlation of certain elements of the organization being represented by broken lines.

It is perhaps universal, and certainly ancient, practice to utilize a considerable variety of live, active creatures as baits for the attraction of fish in connection with the operations of angling. Such baits found to be effective include, as is commonly known, terrestrial, amphibious, and aquatic categories whereof the preservation of life and persistence of activity significant to their adequacy as fish lures depend upon exposure to a suitable environment with accommodation of some freedom for individual movement. In addition, practical considerations quite generally necessitate preliminary acquisition of the live baits in quantity sufficient for the contemplated angling operations and transport thereof by the angler in some fashion that will permit occasional selection and withdrawal for use of an individual bait specimen without providing escape for other components of the bulk supply. Such being the critical aspects of live bait use, supply, and availability, the instant invention is directed to the provision of a novel and improved cage for live baits of the diverse usual categories which ingeniously meets and fully satisfies the conditions attending their employment in connection with angling.

In accordance with and to give effect to the principles of the present invention, the improved cage is organized as a rigid, integrated, hollow, preferably-rectangular unit having a closed bottom 10 interconnecting the corresponding long margins of closed side panels 11, closed ends 12 secured to and transversely of the opposite extremities of said bottom and side panels, and an open top approximating the area of the bottom 10 defined between spacedly-parallel, slightly-inturned margins 11' of the side panels 11 remote from said bottom to span longitudinally of the unit from one end to the other of the ends 12. To facilitate maintenance within the unit of an environment wherein the diverse categories of live baits may live and thrive, the rigidly-associated components of the unit are formed, at least in large part, from material freely permeable to light, air and water, it being eminently practical to shape the bottom 10 and side panels 11 from a single sheet of reticulate or foraminous material for fixed coaction at its ends with shallowly-cupped end members 12 of solid sheet material, as represented by the views of the drawing.

Figure 2:
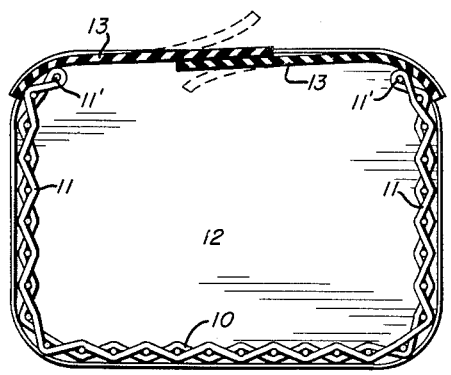
FIGURE 2 is a sectional view taken transversely of the arrangement according to FIGURE 1, relative displacement of yieldable components featuring the organization being indicated by broken lines.

However specifically shaped and constructed, the container unit of the improvement is characterized by an open top approaching in width and length the corresponding dimensions of the unit, is amenable to but nominally-restricted penetration by light, air and water through areas other than its open top, and is featured by unique means ingeniously adapted to normally close said open top with expedient provision for alternative access to the unit interior and the charge therewithin. The closure for the open top of the container unit is comprised, essentially, from a pair of like panels 13 of resilient sheet material, such as rubber, having each a length slightly exceeding that of the opening wherewith associated and a width approaching, but desirably less than, that of said opening. The panels 13 are disposed in parallel, generally-coplanar relation with an extensive lateral overlap of their contiguous long margins effective to establish a width for the combined panels materially exceeding the open width of the container unit top and are securely retained in such relationship by a channelled keeper 14 embracingly affixed to and transversely of the coaligned terminal margins at one end of the panel assembly and by a similar channelled keeper 15 similarly engaged with and affixed to the coaligned terminal margins at the other end of the assembly, thus to unite said panels 13 in and as a flexible closure member characterized by a separable panel margin overlap centrally and longitudinally thereof. The closure member comprised from the panels 13 is secured at one end to elements of the container unit, as by affixing the keeper 14 to a closed end component 12, in such manner as to symmetrically relate the closure member with and to close over the open top of the container unit, in which disposition the outer long side margins of the panels 13 overlie the inturned margins 11' of the side panels 11 to effectively close the lateral extent of the top opening between said inturned margins and are secured to and against separation from the latter by means of clips 16, or the equivalent, applied at about the midlength of the panel 13 margins to inhibit disengagement of the portions of the margins of the panels 13 between the clips 16 and the keeper 14 from the underlying areas of the side panel margins 11' while leaving free for manipulation as a flexible flap anchored at the clips 16 that portion of the panel 13 assembly closing from said clips to the keeper 15, whereby, as is clearly represented in FIGURE 1, elevation of the keeper 15 away from the associated container unit may apply to uncover a considerable area, perhaps one-half, of the top opening of the container unit convenient in size and location for the introduction therethrough of a bulk charge of the live baits desired for subsequent individual use. The manipulable flap portion of the closure member comprised from the panels 13 is arranged to be tensioned and detachably retained in secure covering relation with the proximate portion of the top opening of the container unit as represented by broken lines in FIGURE 1, for which purpose a non-extensible yoke 17, which may be of either rigid or flexible material, converges from attachment to the keeper 15 and away from the panels 13 engaged by the latter as a clip coactable with a hook, or boss, 18 fixedly projecting from the adjacent closed end 12 of the container unit in alignment with the longitudinal bisector of the top opening of said unit; the conformation of said yoke 17 and the location of its complement 18 being so correlated as to require for their latching coaction a moderate tension acting in and to stretch the panels 13. For facility of yoke manipulation into and away from latching engagement with the hook, or boss, 18 a ring 19 desirably is linked to the convergence of the yoke where it provides the added convenience of means useful to attach the cage with its charge confined by the closure member to the person or equipment of an angler in positions of ready use and availability. As should be readily apparent, and as is indicated by the broken line showing of FIGURE 2, the resilient nature of the material forming the panels 13 and the marginal overlap of said panels longitudinally and centrally of the closure member and the container unit top opening combine when the closure member flap is clipped to the container to provide access to the interior of the container unit for manual extraction therefrom of a selected specimen of the bait charge with adequate security of charge retention against inopportune escape, since the overlapped margins of the panels yield to insertion of hand or digits therebetween and separate in close embracing relation about the inserted member to accommodate manipulations interiorly of the container unit beneath the closure member and retraction through the latter of a selected bait specimen without opening any substantial path of escape available to the elements of the bait charge.

Simple, facile, and economical of production as a lightweight, integrated unit of desired capacity, the improvement of the invention is a cage applicable to use submerged in water, partially submerged in water, or entirely away from contact with water for the confinement of diverse categories of live baits under environmental conditions conducive to their sustained life and vigor, the provision of the closure member comprised from the resilient panels 13 in the association with the container unit as shown and described very much enhancing, as above discussed, the practicality and utility of the cage so organized.

Since changes, variations, and modifications in the form, construction, and arrangement of the elements shown and described may be had without departing from the spirit of our invention, we wish to be understood as being limited solely by the scope of the appended claim, rather than by any details of the illustrative showing and foregoing description.

We claim as our invention:

In a live bait cage having a rigid container unit formed with a rectangular, open top from permeable material and a flexible, rectangular closure member adapted to overlie said open top formed from complementary strips of resilient material marginally overlapped at their adjacent longitudinal edges to provide a pressure-yieldable, self-closing slit access opening centrally and longitudinally of the member, the improvement which comprises rigid keepers fixed to and transversely of the ends of the closure member and intersecuring the contiguous ends of its constituent strips, means affixing one of said keepers directly to said container unit adjacent and parallel to an end of the open top thereof, whereby to dispose said closure member for closing coaction with the open top of the container unit and to flex relative thereto under manipulation of the other of said keepers at the other end of the closure member, a non-extensible latch yoke convergently outstanding from connection to said other keeper at the manipulable end of the member and adapted to engage over the proximate end of the container unit at times, and a retainer fixedly projecting exteriorly from said proximate end of the container unit in the median plane of the latter bisecting the open top thereof and disposed for latching engagement with the convergence of said yoke as extended and positioned relative to the container unit through stretching of the closure member material, whereby to effect latched closing coaction of the closure member and the container unit and tensioning of the closure member closely and securely over the open top of the container unit with concomitant enhancement of the self-closing attribute of the slit access opening.

References Cited by the Examiner

UNITED STATES PATENTS

| | | | |
|---|---|---|---|
| 389,162 | 9/88 | Newton | 24—203 |
| 594,448 | 11/97 | Webber | 43—55 |
| 802,405 | 10/05 | Neuenfeldt | 43—55 |
| 2,614,357 | 10/52 | Stoddard | 43—55 |
| 2,731,761 | 1/56 | Marshall | 43—100 |

ABRAHAM G. STONE, *Primary Examiner.*